(12) United States Patent
Falter et al.

(10) Patent No.: US 7,197,987 B2
(45) Date of Patent: Apr. 3, 2007

(54) MAGNET ASSEMBLY FOR THE SUSPENSION AND GUIDANCE OF SUSPENDED VEHICLES AND TRANSPORT SYSTEMS

(75) Inventors: Martina Falter, Cossebaude (DE); Peter Bartusch, Dresden (DE); Ludwig Schultz, Dresden (DE)

(73) Assignee: Leibniz-Institut fuer Festkoerper-und Werkstoffforschung Dresden e.V., Dresden (DE)

( * ) Notice: Subject to any disclaimer, the term of this patent is extended or adjusted under 35 U.S.C. 154(b) by 0 days.

(21) Appl. No.: 10/472,619

(22) PCT Filed: Apr. 23, 2002

(86) PCT No.: PCT/DE02/01508

§ 371 (c)(1),
(2), (4) Date: Nov. 20, 2003

(87) PCT Pub. No.: WO02/085662

PCT Pub. Date: Oct. 31, 2002

(65) Prior Publication Data

US 2004/0107863 A1    Jun. 10, 2004

(30) Foreign Application Priority Data

Apr. 24, 2001    (DE) ................ 101 20 990

(51) Int. Cl.
*B60L 13/00*    (2006.01)

(52) U.S. Cl. .............. 104/281; 104/283; 104/286; 335/216

(58) Field of Classification Search ............... 104/281, 104/282, 283, 284, 285, 286; 335/216; 310/90.5
See application file for complete search history.

(56) References Cited

U.S. PATENT DOCUMENTS

| 4,356,772 A | * | 11/1982 | van der Heide | ............ 104/282 |
| 5,521,570 A |   | 5/1996  | Ito et al. |   |
| 5,631,617 A |   | 5/1997  | Morishita |   |
| 6,418,857 B1 | * | 7/2002 | Okano et al. | ............... 104/281 |

FOREIGN PATENT DOCUMENTS

JP    8-265914    * 10/1996

* cited by examiner

*Primary Examiner*—Mark T. Le
(74) *Attorney, Agent, or Firm*—Jordan and Hamburg LLP

(57) ABSTRACT

A magnet assembly for the suspension and guidance of suspended vehicles and transport systems creates an intrinsically stable, contactless magnetic suspension and guidance system composed of an assembly of magnetic elements and a superconductor assembly for suspended vehicles and transport systems. At least one part of the magnetic element assembly is physically connected to the superconductor assembly. In addition, the magnetic elements assembly and the superconductor assembly are magnetically intercoupled to maintain a stable distance between at least two magnetic elements by the utilization of a magnetic field that is frozen in the superconductor. The magnetic assembly can be used in particular in those vehicles and transport systems that are configured to be displaced along a magnetic rail without making contact with the latter, thus enabling a displacement devoid of friction and abrasion.

12 Claims, 4 Drawing Sheets

MAGNET ASSEMBLY FOR THE SUSPENSION AND GUIDANCE OF SUSPENDED VEHICLES AND TRANSPORT SYSTEMS

BACKGROUND OF THE INVENTION

The invention relates to a magnet assembly for the suspension and guidance of vehicles and transport systems. The magnet assembly can be used particularly for those vehicles and transport systems, which are constructed for locomotion along a magnetic rail without contacting the latter and, with that, make possible a frictionless and wear-free locomotion.

In principle, two magnets cannot assume a stable position relative to one another without contact or support. Any magnetic transporter system, which is based on magnetic levitation, therefore requires a mechanical support or a control of the magnetic fields. If magnetic guidance for a stable, suspended state is to be realized with these elements, additional guiding magnets are required aside from the supporting magnets.

A stable, contactless magnetic suspension is, however, possible with superconductors in suitably shaped magnetic fields since, contrary to all other materials, a superconductor either does not penetrate into the magnetic field or, once such a magnetic field is present in its interior, maintains it unchanged. This is due to the fact that the magnetic flux penetrates into a superconductor in the form of flux lines, which can be anchored at defects in the material. Accordingly, if a superconductor, which contains many so-called pinning centers, is cooled in an inhomogeneous magnetic field to a temperature below its superconducting transition temperature, the form of this external magnetic field can be "frozen" in the respective position in the superconductor. If an attempt is now made to bring the superconductor out of this position, then this attempt is counteracted by a restoring force, which may be very large. For example, if the superconductor is made superconducting in a position, which is fixed by means of a spacer a few millimeters or centimeters above a magnetic rail, the superconductor retains this position, even after the spacer is removed, without contacting the rail. In other words, the superconductor has a repelling as well as an attracting effect in the magnetic field. If the magnetic rail has a uniform magnetic field along its length, the superconductor can move along the rail without contact and, with that, also without friction and without wear.

With the help of this principle, the possibility has already been demonstrated of the contactless transport in a state suspended above a magnetic rail, but also along a wall, which is equipped with a magnetic rail, as well as freely suspended below a magnetic rail. The disadvantage of such an assembly lies therein that the superconductor requires cooling. In the event that the cooling fails, such a suspended transporting system would crash in the absence of additional safeguards.

SUMMARY OF THE INVENTION

It is an object of the invention to create an intrinsically stable, contactless, magnetic suspension and guidance, consisting of a magnet parts assembly and a superconductor assembly, for suspended vehicles and transporting systems.

Pursuant to the invention, the magnet parts assembly is connected with at least one of its parts physically with the superconductor assembly and the magnet parts assembly and the superconductor assembly are coupled magnetically with one another in order to main a stable distance between at least two magnet parts, utilizing a magnetic field, which is frozen into the superconductor.

The assembly of magnet parts may consist of one or more pairs of mutually attracting or repelling magnet parts, which are kept at a stable distance from one another by the superconductor assembly.

The superconductor assembly may consist of one or more superconductors.

Advisably, the assembly of magnet parts may contain one or more rail-shaped magnet parts.

The magnet parts may consist of ferromagnetic, soft magnetic or ferromagnetic hard magnetic materials and/or may be constructed as electromagnets.

Instead of ferromagnetic, hard-magnetic materials, it is also possible to use superconductors.

In accordance with an appropriate development of the invention, the superconductor assembly is equipped with superconductors, which consist of a melt-texturized YBaCuO material.

In accordance with an advantageous development of the invention, the superconductor assembly is surrounded at least partially by a heat-insulating material. In addition to the superconductor assembly, the magnet parts assembly can also be surrounded at least partly with a heat-insulating material.

The superconductor assembly may be provided at least partly with a protective layer to avoid oxidation and/or the effects of moisture.

The invention is explained in greater detail below by means of examples.

DESCRIPTION OF THE PREFERRED EMBODIMENTS

EXAMPLE 1

Figure 1:
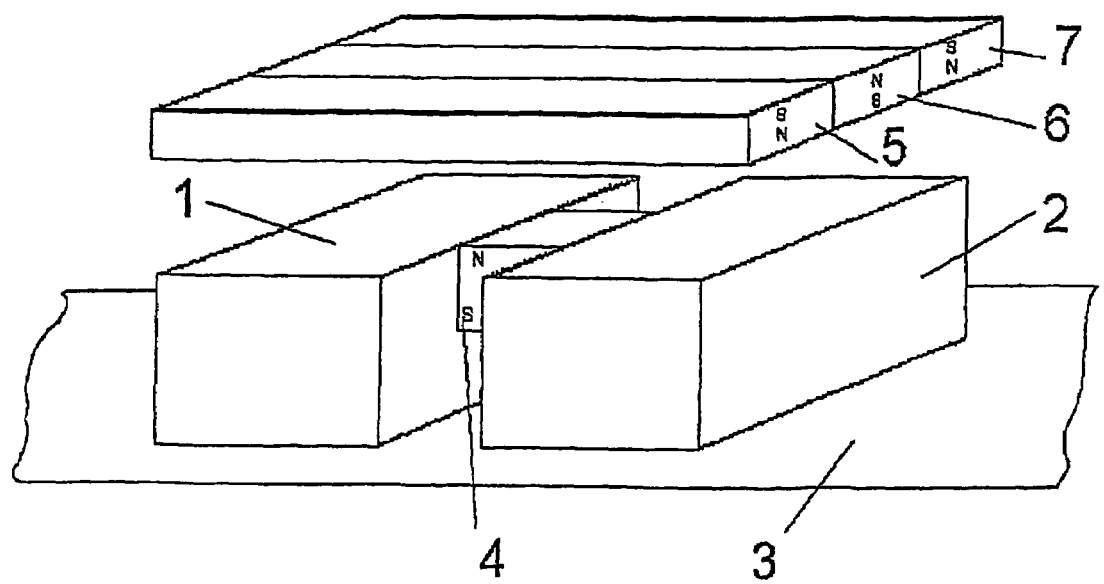
FIG. 1 shows a diagrammatic representation of a contactless magnet suspension for transporting goods.

For the magnetic suspension, shown in FIG. 1, two superconductors 1; 2 are fastened at a distance from one another on a support 3, which is shown only partly. The support 3 serves to accommodate goods, which are to be transported. The superconductors 1; 2 are connected firmly with a magnet part 4, which consists of a ferromagnetic, hard magnetic material. This assembly hangs at a constant distance underneath 3 magnetic rails 5; 6; 7, which are disposed next to one another and have a uniform magnetic field along their length.

The outer magnetic rails 5 and 7 are poled magnetically, so that their north pole is at the bottom. On the other hand, the south pole of the other magnetic rail 6, which is disposed between the two magnetic rails 5 and 7, is at the bottom.

The superconductors 1; 2 consist of melt-texturized YBaCuO material. They are fixed at a distance of a few millimeters below the magnetic rails 5; 6; 7 by means of an interposed spacer, which is not shown in the drawing, and cooled in this position to a temperature below their superconducting transition temperature and thereby made superconducting. At the same time, the form of the inhomogeneous external magnetic field, which, starting out from the magnetic part 4 and the magnetic rails 5; 6; 7, acts on the superconductor 1; 2, is frozen in the superconductors 1; 2 at their pinning centers. As a result, the superconductors 1; 2 retain their position with respect to the magnetic rails 5; 6; 7 after removal of the spacer. This refers to the distance between the superconductors 1; 2 and the magnetic rails 5; 6; 7, as well as to the position of the superconductors 1; 2 transversely to the longitudinal axis of the magnetic rails 5; 6; 7. A restoring force, which starts out from the superconductors 1; 2, acts counter to any force, which acts in the direction of a positional change. With that, a secure suspension, as well as the guidance of the transporting assembly is ensured. The lateral guiding forces, perpendicular to the longitudinal axis of the magnetic rails 5; 6; 7, are amplified even more here by the magnet part 4.

The assembly with the support 3, consisting of the superconductors 1; 2 and the magnetic part 4, can be moved without resistance in the direction of the longitudinal axis of the magnetic rails 5; 6; 7, since the magnetic rails 5; 6; 7 have a uniform magnetic field along their length. Because of the constant distance maintained between the superconductors 1; 2 and the magnetic rails 5; 6; 7, this movement is contactless and, with that, without friction and wear.

In the event of an intentional or unintentional interruption of the superconductor effect, the magnetic part 4 would be attracted to the magnetic rail 6, so that a crash of the assembly, consisting of the superconductors 1; 2, the magnet part 4 and the support 3, is avoided.

EXAMPLE 2

This example is based on the magnet assembly described in Example 1 and relates to a particularly space-saving possibility.

Figure 2:
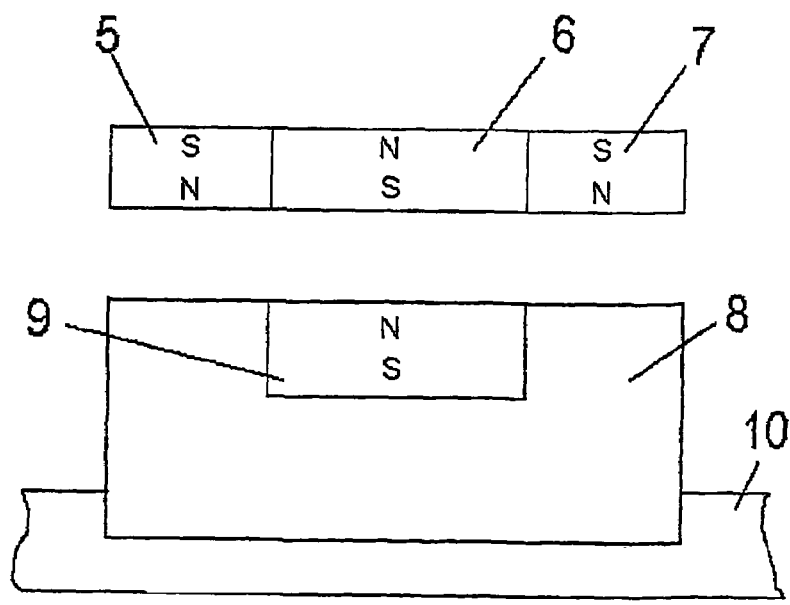
FIG. 2 shows a diagrammatic representation of a further contactless magnet suspension for transporting goods.

Only a single superconductor 8, in which, however, a magnet part 9 is contained, is positioned suspended here below the magnetic rails 5; 6; 7, as shown in FIG. 2. The magnet part 9 consists of a ferromagnetic, hard magnetic material. The assembly, consisting of the superconductor 8 and the magnet part 9, is connected with a support 10 for accommodating transported goods.

The outer magnet rails 5 and 7 are poled magnetically so that their north pole is at the bottom. On the other hand, for the magnetic rail 6, which is disposed between the outer magnetic rails 5 and 7, the south pole is at the bottom. The magnet part 9 is disposed so that its north pole is directed towards the magnetic rail 6.

The inhomogeneous, external magnetic field, which, starting out from the magnetic part 9 and the magnetic rails 5; 6; 7, acts on the superconductor 8, is frozen in the superconductor 8 at the pinning centers of the latter. As a result, the superconductor 8 with the magnet part 9 retains its distance from and its lateral position relative to the magnetic rails 5; 6; 7, as described in Example 1.

Because the distance between the superconductors 8 and the magnetic rails 5; 6; 7 is kept constant, this movement is contactless and therefore without friction and wear.

EXAMPLE 3

Figure 3:
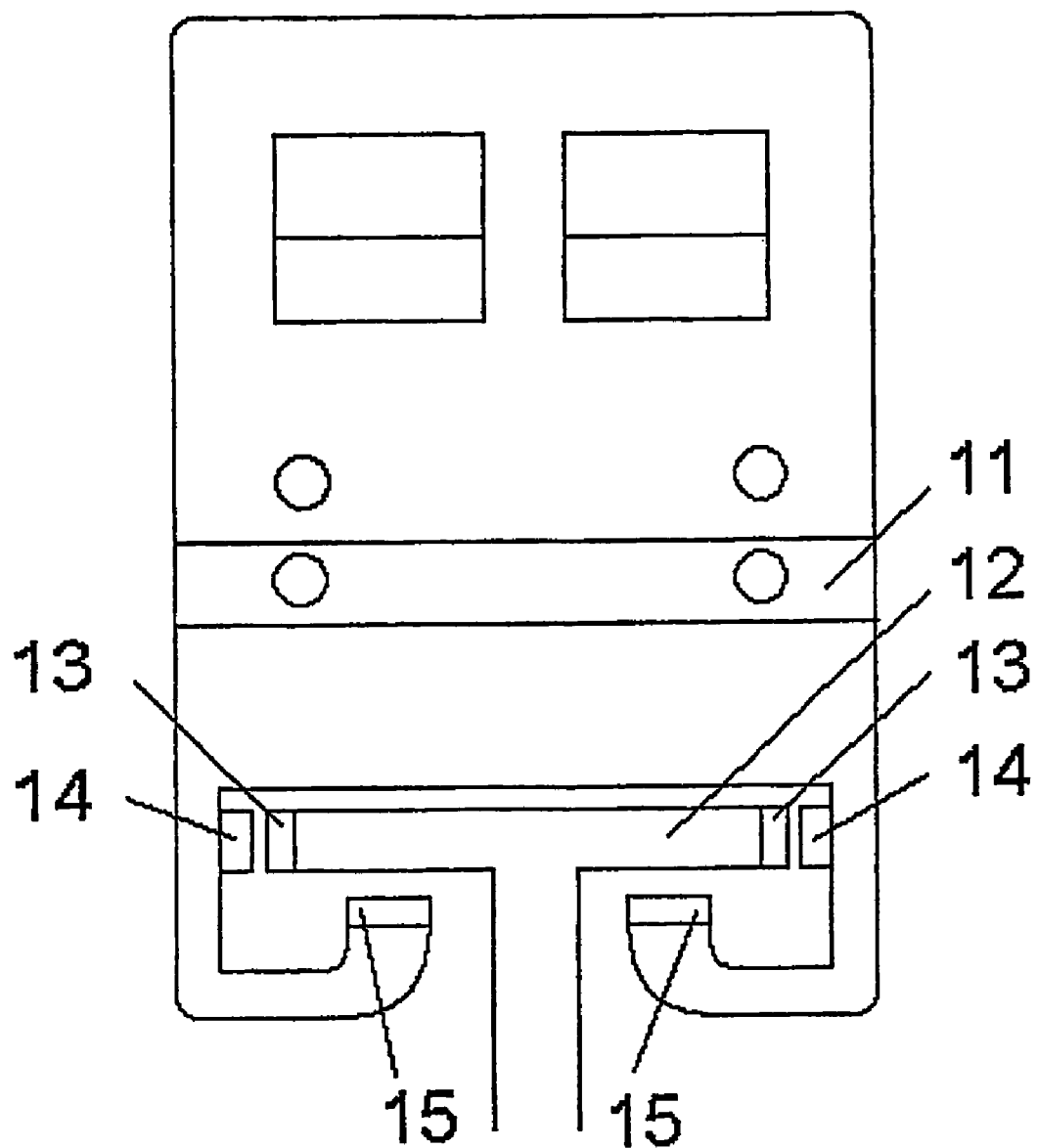
FIG. 3 shows a diagrammatic representation of a contactless magnet assembly at a rail vehicle.

This example relates to the use of the inventive magnet assembly at a rail vehicle 11 in the form of a maglev system, which moves contactlessly along a T-shaped rail 12 (FIG. 3). At the same time, electromagnets 13 are disposed at the ends of the crossmember of the T-shaped rail 12 and generate an inhomogeneous magnetic field in the vertical and lateral directions, but a uniform magnetic field in the longitudinal direction of the rails. Superconductors 14 are disposed at the underside of the rail vehicle 11 opposite to the electromagnets 13 and exercise the function of the superconductors 1; 2, which is described in Example 1, in that they ensure the suspension as well as the guidance of the rail vehicle 11.

The rail vehicle 11 is carried suspended with the help of electromagnets 15, which are below the rail 12 consisting of the ferromagnetic material, attractive magnetic forces existing between the electromagnets 15 and the rail 12.

The rail vehicle 11 is driven in a known manner by a synchronous long stator linear mentor, which is not shown in the drawing.

Figure 4:
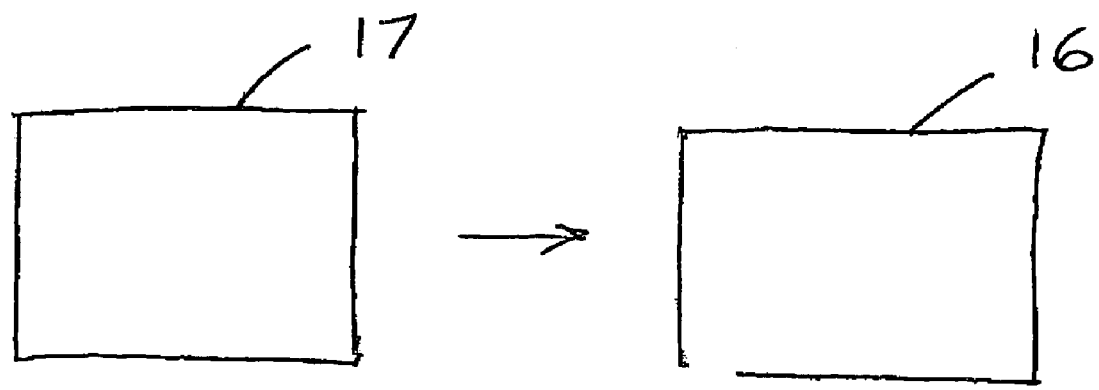
FIG. 4 illustrates a box representation of a protective layer to be provided to at least partially surround another box representation of a superconductor assembly of the magnet suspension.

FIG. 4 illustrates, as a box representation, a protection layer 17 for at least partial disposition around the superconductor 18.

Figure 5:
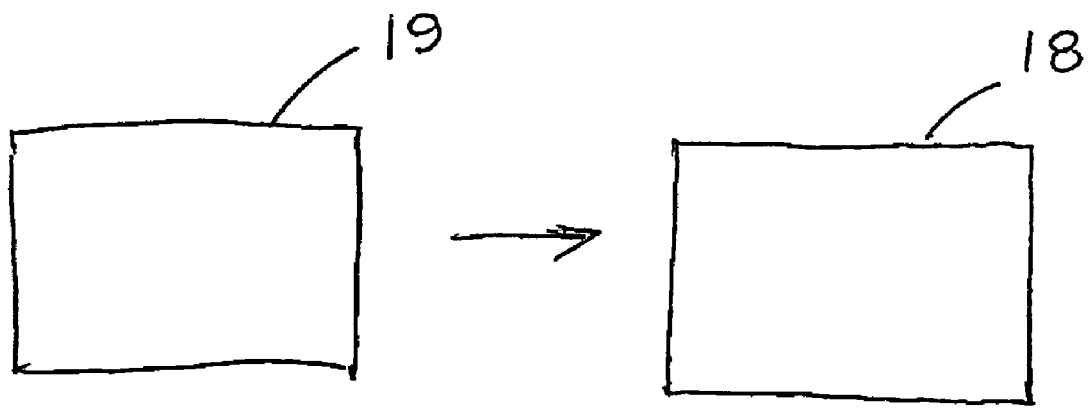
FIG. 5 illustrates a box representation of a thermally insulating material to be provided to at least partially associate with another box representation of the superconductor assembly.

FIG. 5 illustrates, as a box representation, a thermally insulating material 19 for at least partial disposition around the superconductor 16.

The invention claimed is:

1. A magnet arrangement for suspending and guiding vehicles and transport systems, comprising:
   a rail defined at least in part by a first magnet; and
   a superconductor assembly to which a support is receivable, said superconducting assembly including at least one superconductor physically connected to a second magnet, said second magnet being disposed in a position in said superconductor assembly such that said second magnet faces said first magnet and is oriented such that said first and second magnets mutually attract when said superconductor is arranged for transport along said rail, a magnetic field created by said first and second magnets being frozen in said at least one superconductor when a superconductor effect is induced, thereby maintaining a predetermined distance between said second magnet and said second magnet, said first magnet being pulled towards said first magnet in the event of an interruption of the superconductor effect, and thereby a crash of the superconductor assembly is prevented.

2. The magnet arrangement of claim 1, further comprising at least one additional pair of mutually attracting or repelling magnets which are held at said predetermined distance from one another by the superconductor assembly.

3. The magnet arrangement of claim 1, wherein the superconductor assembly comprises at least one additional superconductor.

4. The magnet arrangement of claim 1, wherein said first magnet comprises a part of a magnet assembly including a total of at least two rail-shaped magnets.

5. The magnet arrangement of claim 1, wherein said at least one superconductor is comprised of a melt texturized YBaCuO material.

6. The magnet arrangement of claim 1, further comprising a thermally insulating material, said insulating material at least partially surrounding said superconductor assembly.

7. The magnet arrangement of claim 1, wherein the superconductor assembly further comprises a layer, said layer protecting said superconductor assembly against at least one of oxidation and moisture.

8. The magnet arrangement of claim 1, wherein said at least one superconductor is comprised of a melt texturized YBaCuO material.

9. A magnet arrangement for suspended guidance transport systems, comprising:

a first magnet at least in part defining a rail; and a superconductor assembly to which a support for accommodating items to be transported along the rail is receivable, said superconductor assembly including at least one superconductor and a second magnet, said second magnet being physically connected to said at least one superconductor and oriented such that when the superconductor assembly is placed in an operable position relative to said rail, said first and second magnets are oriented to mutually attract one another and, when a superconductor effect is induced in said at least one superconductor, a magnetic field created by said first and second magnets is frozen in the superconductor thereby maintaining a predetermined distance between said first and second magnets and, in an event of interruption of the superconductor effect, said second magnet is drawn towards said first magnet, and thereby a crash of the superconductor assembly is prevented.

10. The magnet assembly of claim 9, wherein the rail comprises third and fourth magnets disposed laterally on opposed sides of said first magnet.

11. The magnet assembly of claim 10, wherein:

the first, third and fourth magnets each includes a upper side and a lower side; and each of the first, third and fourth magnets are magnetically poled, each of the third and fourth magnets having a north pole at the lower side thereof, and the first magnet having a south pole at the lower side thereof.

12. The magnet assembly of claim 10, wherein:

the first, third and fourth magnets each includes a upper side and a lower side; and each of the first, third and fourth magnets are magnetically poled and include a first pole and a second pole opposite to said first pole, each of the third and fourth magnets having said first pole oriented at the lower side thereof, and the first magnet having said second pole oriented at the lower side thereof.

* * * * *